Jan. 8, 1935.  F. C. SVOBODA  1,987,086
VEHICLE DIRECTION SIGNAL
Filed April 15, 1930  2 Sheets-Sheet 2
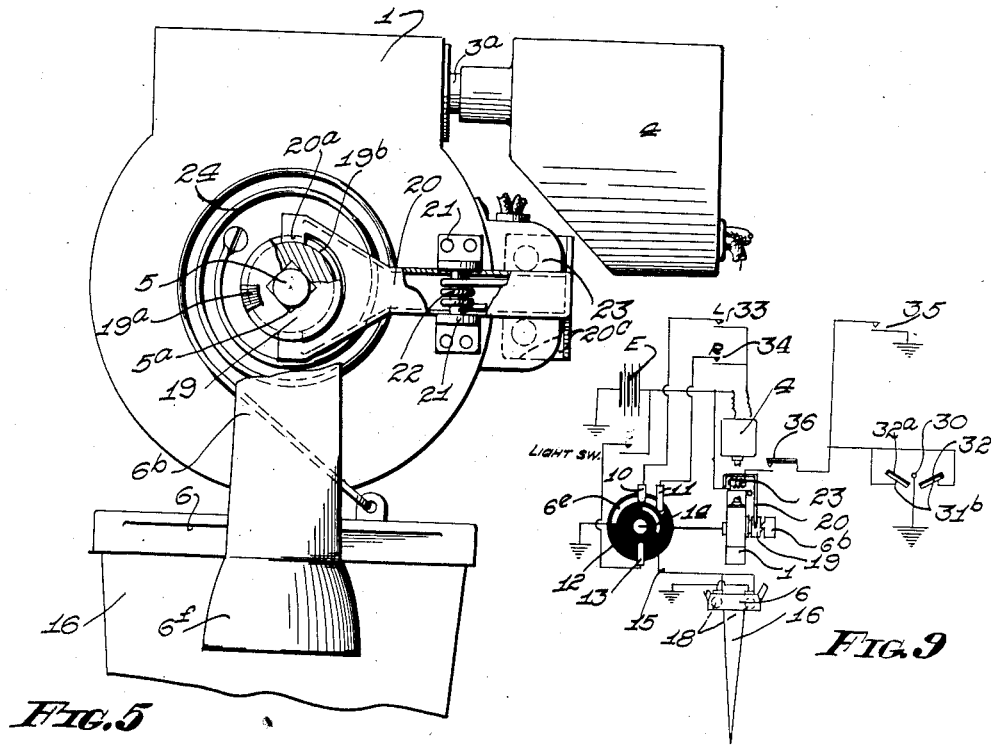
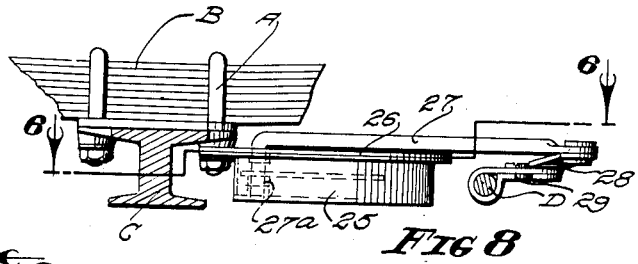
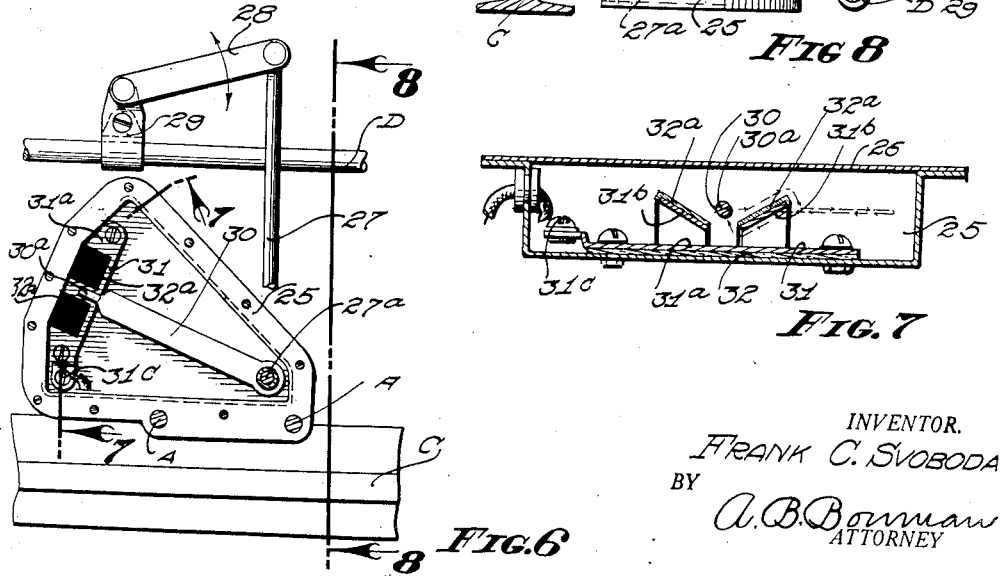
INVENTOR.
FRANK C. SVOBODA
BY
A. B. Bowman
ATTORNEY Patented Jan. 8, 1935

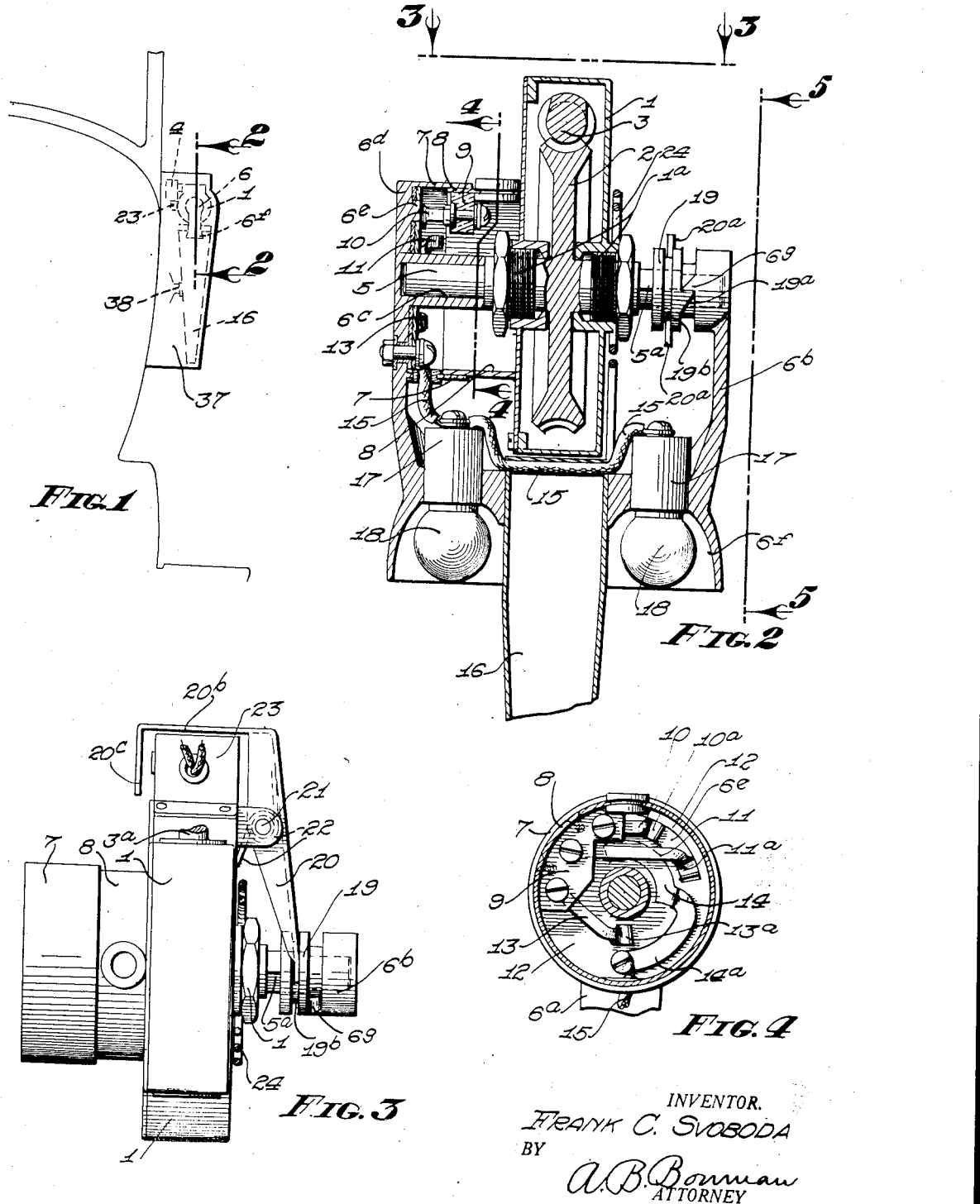

1,987,086

UNITED STATES PATENT OFFICE 1,987,086

VEHICLE DIRECTION SIGNAL

Frank C. Svoboda, San Diego, Calif.

Application April 15, 1930, Serial No. 444,452

5 Claims. (Cl. 177—337)

My invention relates to vehicle direction signals, and the objects of my invention are:

First, to provide a vehicle signal which is particularly easy to operate;

Second, to provide an improved electrically driven signal of the semaphore type in which a switch is provided for each desired position of the signal arm, said switches controlling circuits through the driving mechanism for operating said arm, said circuits also controlled by said signal arm, whereby the driver does not have to watch the signal arm, but may rely upon said signal arm to break the circuit when it reaches the desired position, thereby enabling the driver to keep his eyes upon traffic;

Third, to provide a vehicle direction signal which, should the driver make a mistake and signify a turn which he does not desire to make, he may readily and quickly change the position of the signal arm so as to indicate the desired turn and avoid confusion;

Fourth, to provide an automatically operated switch and release mechanism actuated thereby for use in connection with a signal of this class which releases the signal arm and allows the same to return to its normal or concealed position, said switch being automatically operated when the wheels of a vehicle are straightened out after a turn is made; and Fifth, to provide on the whole a novelly constructed vehicle direction signal which is simple of construction proportional to its functions, durable, efficient and rapid of operation, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a reduced front elevational view of my signal mechanism, with adjacent portions of a vehicle shown by outline; Fig. 2 is an enlarged fragmentary sectional view thereof, through 2—2 of Fig. 1, with the outer casing removed and with parts and portions shown in elevation; Fig. 3 is a fragmentary plan view thereof from the line 3—3 of Fig. 2, with the outer casing removed; Fig. 4 is a fragmentary sectional view through 4—4 of Fig. 2, with parts and portions in elevation; Fig. 5 is a fragmentary elevational view taken from the line 5—5 of Fig. 2, with the outer casing removed; Fig. 6 is a plan view of the automatic switch mechanism with the cover plate removed and showing essential adjacent portions of the vehicle; Fig. 7 is an enlarged sectional view thereof through 7—7 of Fig. 6; Fig. 8 is another sectional view thereof through 8—8 of Fig. 6; and Fig. 9 is a wiring diagram of the signal and the control apparatus.

Similar characters of reference refer to similar parts and portions throughout the several views of the drawings.

Gear casing 1, worm gear 2, worm 3, motor 4, worm gear shaft 5, signal arm supporting yoke 6, outer shield 7, inner shield 8, contact support 9, left turn contact member 10, right turn contact member 11, insulation disks 12, light circuit contact 13, contacting strip 14, wire to lights 15, signal arm 16, light sockets 17, light globes 18, clutch collar 19, releasing lever 20, fulcrum member 21, spring 22, magnet coil 23, signal arm returning spring 24, return switch casing 25, cover 26, operating lever 27, adjusting link 28, clamp member 29, contact arm 30, fixed contact member 31, insulation 32, left turn switch 33, right turn switch 34, auxiliary signal arm return switch 35, thermostat switch 36, housing 37, and bumper means 38 constitute the principal parts and portions of my novel vehicle directional signal.

A gear casing 1 is supported by any suitable means, not shown, preferably on the driver's side, forwardly of the driver's door and below his line of vision. Within the gear casing is a worm gear 2 mounted with its axis extending longitudinally with the car. Above the worm gear 2, is a worm 3, having a shaft 3a which extends out of the casing 1, and is connected in any suitable manner to a small electric motor 4 mounted contiguous to the casing, preferably between the casing and the body of the vehicle, as shown by dotted outline in Fig. 1.

The worm gear 2 is provided with a worm gear shaft 5, which projects forwardly and rearwardly of the casing 1 through suitable packing glands 1a. At the ends of the shaft 5 are journalled the arms 6a and 6b of the signal arm supporting yoke 6, which extends around the margin of the casing 1. The arm 6a of the yoke 6 is provided with a bearing portion 6c which fits in the end of the shaft 5. Surrounding the bearing portion 6c, at the extended end of the shaft 5, is an annular base portion 6d.

The base portion 6d of the arm 6a is defined by a cylindrical shield 7, which extends from the base member towards the casing 1 in concentric relation to the bearing portion 6c. A similar cylindrical shield 8 is secured to the adjacent face of the casing 1 and extends in telescoping relation with the shield member 7.

The shield 8 extends within the shield 7 and has secured therein a contacting support 9. Secured by one of their ends to the contact support 9 is a left turn contact member 10, and a right turn contact member 11. The other or extended ends 10a and 11a, respectively, of these contact members are adapted to follow a common arcuate path. In this path, is an arcuate ridge 6e extending from the base 6d, which is adapted to be engaged by the contacting ends 10a and 11a of the contact members. The base 6d is covered except for the arcuate ridge 6e with insulating disk 12, the exposed surface of which is flush with said ridge. It is preferred to have the casing 1 and consequently the yoke 6 grounded to the frame of the vehicle. The contact members 10 and 11 are thus adapted to ground a circuit, which will be described hereinafter in more detail, through the motor 4.

When the contact members reach the end of the arcuate strip 6e, they break the circuit; thus the signal arm is caused to rotate by the motor until the contact member carrying the current passes the end of the arcuate ridge 6e, whereupon the circuit is broken. As one contact trails the other, the signal arm may be shifted to a horizontal or to an upwardly inclined position.

In addition to the contact members 10 and 11, a third contact member, not shown, may be provided, which would also ride on the arcuate strip 6e. This latter contact member would serve to stop the signal arm when pointing downwardly or in position for indicating the "Stop" sign. Such a contact is mere duplication of the structure already shown. Also mounted on the contact support 9, is a contact 13 which operates electric lights in connection with the signal arm. The extended end 13a of this contact rides on the insulation disk 12, in a path offset from that of the contact ends 10a and 11a of the contact members 10 and 11. This is shown best in Fig. 4.

Embedded in the insulating disk 12, but separated from contact with the base member 6d, is an arcuate contacting strip 14. This contacting strip is adapted to be engaged by the contact 13 when the signal arm is in certain positions. The contact strip 14 is provided with an offset arm 14a, which is clear of the several contacts 10, 11, and 13, and which is secured to one end of a wire 15, which leads to the electric lights for illuminating the signal arm.

The signal arm 16 is supported by the yoke 6 midway between the arms 6a and 6b. When in its normal position, the signal arm hangs vertically as shown by dotted outline in Fig. 1. The signal arm 16 may have any suitable outline. At the front and rear sides of the signal arm 16, the yoke 6 is provided with reflector portions 6f in which are mounted light sockets 17 adapted to receive electric light globes 18 of the conventional one contact type used in connection with vehicles. The wire 15 leads from the arcuate strip 14 to the terminal of each light socket 17.

Between the end of the shaft journalled in the end of the arm 16 of the yoke and adjacent the packing gland 1a, said shaft is provided with a polygonal shaped portion 5a, upon which is slidably mounted a driving collar 19. The collar 19 is provided with a tooth 19a in the outer side thereof, which is adapted to engage a corresponding tooth 6g supported on the inner side and at the extended end of the arm 6b, as shown best in Fig. 2.

The collar 19 is provided with an annular groove 19b therein, which receives the forked end 20a of a lever 20. The lever 20 extends from the collar 19 and towards the side of the casing 1 at which the motor 4 is mounted. Adjacent this side of the casing 1, said lever is journalled upon a pin which is supported by a fulcrum member 21 in the form of a suitable fitting extending out from the casing 1. The lever 20 may be stamped from sheet metal so as to be of U-shaped cross section and provide space for a spring 22, which is wrapped around the pin, as shown in Figs. 3 and 5. Said spring is adapted to yieldably hold the collar 19 against the inner side of the arm 6b. It will be noted that the joint between the collar 19 and the forked portion 20a of the lever is loose enough to permit the desired sliding movement of the collar.

Mounted at the rear side of the casing 1, towards which the lever 20 extends, is a magnet coil 23. The axis of the coil 23 extends parallel with the shaft 5, and is arranged so that its operating end faces the side of the casing opposite from the lever 20. The extended end of the lever 20 continues past the fulcrum member 21 and forms an arm 20b which extends around the magnet coil 23 and over the operating end thereof. The extended end of the lever 20 contiguous to the operating ends of the magnet coil 23, forms a bar 20c, which is adapted to be attracted by the core of said coil. This movement, it will be seen, releases the tooth 19a from the tooth 6g.

Wound around the one end of the axle of the shaft 5, in spaced relation thereto, is a spring 24, the one end of which is secured to the casing 1, and the other end of which is secured to the yoke 6. This spring tends to shift the signal arm to the vertical position shown in Fig. 1.

The magnet coil 23 is operated by the automatic switch mechanism shown in Figs. 6, 7, and 8. This mechanism comprises a casing 25 preferably supported by the U-bolt A which secures one of the front springs B to the front axle C. The casing 25 extends rearwardly of the front axle.

The casing 25 is substantially the shape of a sector, and is provided with a suitable cover 26. Supported at the apex of the casing 25, and extending through the cover 26 is a journal portion 27a of an operating rod 27. After extending above the cover 26 of the casing, said rod is bent at right angles and extends rearwardly from the axle C into overlapping relation with the tie rod D.

Pivotally secured to the extended ends of the operating lever 27 is an adjusting link 28, which is adjustably secured at its other end to a clamp member 29 adapted to fit around the tie rod D, as shown in Figs. 6 and 8. Although the position of the tie rod D relative to the front axle varies with different cars, it is thus possible without change in the arm 27 to secure the switch mechanism to any make of vehicle.

Secured to the journal portion 27a of the arm 27, within the casing 25, is a contact arm 30, which is in the form of a flat spring adapted to oscillate in a vertical plane. The contact arm extends into contiguous relation with the arcuate side of the casing 25. Supported adjacent this substantially arcuate side, is a fixed contact member 31. The contact member 31 is preferably made of sheet metal and comprises a base portion 31a secured to but separated from the base of the casing 25 by insulation 32. The side of said base portion adjacent the arcuate end of the casing 25 is bent upwardly in two places, then doubled over itself forming a pair of contact plates 31b. The contact plates 31b converge downwardly as shown best in Fig. 7. The insulation follows the upwardly extending portions of the base 31a and extends over the upper sides of the contact plates forming insulating shield portions 32a. The extended end 30a of the contact arm 30 is reduced in size and, when the wheels of the vehicle are pointing ahead so as to guide the vehicle in a straight course, said extended end 30a is located midway between the contact plates 31b.

When the wheels of the vehicle are turned in either direction, the end of the contact arm rides upon one of the insulating shields 32a, and is deflected upwardly until it passes over the contact plate 31b.

When the wheels are again straightened out, the contact arm swings back, this time the end 30a thereof engaging the under or exposed side of the contact plate 31b, making a momentary contact therewith. The end 30a rides down the under side of the contact plate 31b, until past the lower end thereof, whereupon it shifts upwardly between the two contact plates. The course of the end 30a is indicated by dotted lines and arrows in Fig. 7.

The fixed contact member 31 is connected through a terminal 31c with the magnet coil 23, while the contact arm 30 is grounded.

With reference to the diagrammatical view of Fig. 9, it can be seen that one terminal of the magnet coil is connected directly to the battery, while the other terminal thereof is connected to fixed contact member 31.

The one lead of the motor 4 is connected to the vehicle battery E, while the other lead thereof is connected through switches 33 and 34, to the contact members 10 and 11, respectively, and through these contact members, to the ground. Likewise, the terminal 13 is connected through the switch designated light SW which controls lights of the vehicle to the battery E, while the contact strip 14 is connected to the lights 18 which illuminate the signal arm 16.

An auxiliary, manually operated switch 35 may be arranged in parallel with the automatic switch mechanism. This auxiliary switch 35 is preferably located adjacent to the switches 33 and 34.

A thermostat switch 36 may be located in the line between the switches controlling the magnet coil 23. This is for the purpose of breaking the circuit through the coil 23 should the wheels of the vehicle hold the contact arm 30 in engagement with one of the contact plates 31b as when the vehicle is parked.

The signal arm and its operating mechanism is preferably enclosed in a suitable housing 37 as shown in Fig. 1. Bumper means 38 is preferably provided in the housing 37 for the purpose of absorbing the shock when the signal arm moves to its lowered position.

Operation of the signal is as follows: When desiring to make a left hand turn, the switch 33 is depressed, completing a circuit through the motor and contact 10. This causes rotation of the shaft 5 until the tooth 19a of the collar 19 engages the corresponding tooth 6g of the yoke 6, whereupon the signal arm is rotated to a horizontal position. At this point the contact 10 moves clear of the grounding contact ridge 6e, whereupon the circuit is broken and the arm remains in position by reason of the worm drive between the motor 4 and shaft 5.

As the vehicle makes the turn, the contact arm 30 moves across the insulated side of one of the contact plates 31b. When the wheels are straightened out again, the contact arm moves across the exposed side of the contact plate 31b and makes a momentary completion of the circuit through the magnet coil 23, causing the tooth 19a to disengage the tooth 6g, and allow the signal arm 16 by reason of gravity and the action of the spring 24, to shift to its lowered or normal position. The same is true when making a right-hand turn except that the circuit is through switch 35 and contact 11, instead of switch 34 and contact 10.

If a mistake should be made in the signalling, as, for example, a left-hand turn is desired instead of a right-hand turn, as soon as the error is discovered the hand switch 35 may be operated so as to ground the magnet coil 23 and complete the circuit therethrough, whereupon the signal arm resumes its normal position ready to be shifted again, this time to its correct position.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a vehicle direction signal, a driving mechanism including a rotatable driving shaft, a casing for said driving mechanism, the ends of said shaft protruding from said casing, a signal arm including a yoke portion journaled upon said driving shaft and straddling said casing, a clutch arranged to connect said yoke portion with said shaft, means normally retaining said signal arm in an inoperative position, said driving mechanism arranged to shift said signal arm against the action of said retaining means, and means for releasing said clutch whereby said signal arm is free to return to its inoperative position.

2. In a vehicle direction signal, an electrically controlled driving mechanism including a rotatable driving shaft, a casing for said driving mechanism, the ends of said driving shaft protruding from said casing, a yoke member arranged to journal upon the ends of said driving shaft, a clutch means associated with one fork of said yoke member for connecting said yoke member to said shaft, and a switch structure for limiting the extent of movement of said yoke member by action of said driving mechanism, said switch structure including a portion carried by the other fork of said yoke member and movable therewith and a fixed portion carried by said casing and a signal arm carried by said yoke member.

3. In a vehicle direction signal, an electrically controlled driving mechanism including a rotatable driving shaft, a casing for said driving mechanism, the ends of said driving shaft protruding from said casing, a yoke member arranged to journal upon the ends of said driving shaft, a clutch means associated with one fork of said yoke member for connecting said yoke member to said shaft, a multiple switch structure associated with the other fork of said yoke member, said switch structure including contacts supported from said casing, contact bars supported from said other fork of said yoke member arranged to coact with said contacts and complete a circuit through said driving mechanism, said contacts arranged to disengage said contact bars when said yoke member occupies predetermined positions, a signal arm carried by said yoke member, and illuminating means carried by said yoke member arranged to flood light the sides of said signal arm, said switch mechanism including contacts for closing a circuit through said illuminating means.

4. In a vehicle direction signal, an electrically controlled driving mechanism including a rotatable driving shaft, a casing for said driving mechanism, the ends of said driving shaft protruding from said casing, a yoke member arranged to journal upon the ends of said driving shaft, a clutch means associated with one fork of said yoke member for connecting said yoke member to said shaft, a switch structure for limiting the extent of movement of said yoke member by action of said driving mechanism said switch structure including a portion carried by the other fork of said yoke member and movable therewith and a fixed portion carried by said casing, a signal arm carried by said yoke member, and automatic releasing means for said clutch.

5. In a vehicle direction signal, an electrically controlled driving mechanism including a rotatable driving shaft, a casing for said driving mechanism, the ends of said driving shaft protruding from said casing, a yoke member arranged to journal upon the ends of said driving shaft, a clutch means associated with one fork of said yoke member for connecting said yoke member to said shaft, a multiple switch structure associated with the other fork of said yoke member, said switch structure including contacts supported from said casing, contact bars supported from said other fork of said yoke member arranged to coact with said contacts and complete a circuit through said driving mechanism, said contacts arranged to disengage said contact bars when said yoke member occupies predetermined positions, a signal arm carried by said yoke member and automatic releasing means for said clutch.

FRANK C. SVOBODA.